(12) United States Patent
Chen

(10) Patent No.: US 12,553,529 B1
(45) Date of Patent: Feb. 17, 2026

(54) DIRECT-FIT VERTICAL GAS PROPORTIONAL VALVE

(71) Applicant: Xiong Chen, Songzi (CN)

(72) Inventor: Xiong Chen, Songzi (CN)

( * ) Notice: Subject to any disclaimer, the term of this patent is extended or adjusted under 35 U.S.C. 154(b) by 0 days.

(21) Appl. No.: 19/174,949

(22) Filed: Apr. 10, 2025

(30) Foreign Application Priority Data

Mar. 14, 2025 (CN) .......................... 202520454524.1

(51) Int. Cl.
*F16K 17/24* (2006.01)
(52) U.S. Cl.
CPC .................................... *F16K 17/24* (2013.01)
(58) Field of Classification Search
CPC . F16K 17/24; F16K 1/34; F16K 31/42; F16K 11/161; F16K 11/10; F24H 15/305; F24D 19/051
See application file for complete search history.

(56) References Cited

U.S. PATENT DOCUMENTS

| | | | | |
|---|---|---|---|---|
| 10,495,321 | B2 * | 12/2019 | Park ...................... | F24H 15/305 |
| 2004/0118463 | A1 * | 6/2004 | Yamamoto ......... | G05D 16/2024 |
| | | | | 137/625.65 |
| 2013/0312730 | A1 * | 11/2013 | Stark ....................... | F23N 1/005 |
| | | | | 126/116 A |
| 2016/0069473 | A1 * | 3/2016 | Kucera ............... | F16K 37/0091 |
| | | | | 137/637 |
| 2022/0397210 | A1 * | 12/2022 | Fan ........................... | F16K 1/34 |

FOREIGN PATENT DOCUMENTS

| | | | | |
|---|---|---|---|---|
| CN | 207035457 | | * | 2/2018 |
| CN | 215110841 | | * | 12/2021 |
| CN | 116816974 | | * | 3/2022 |
| CN | 114763840 | | * | 7/2022 |
| CN | 217030066 | | * | 7/2022 |
| CN | 114992638 | A | * | 9/2022 |
| WO | WO-2022085157 | A1 | * | 4/2022 ............... F16K 1/32 |

(Continued)

OTHER PUBLICATIONS

Translation of CN114763840 retrieved from espacenet.com (Year: 2025).*

(Continued)

*Primary Examiner* — Jessica Cahill
(74) *Attorney, Agent, or Firm* — Hemisphere Law, PLLC

(57) ABSTRACT

Provided is a direct-fit vertical gas proportional valve, including a valve body, a gas shut-off component and a gas proportional control component. The valve body is internally provided with first and second valve chambers. A first valve hole is provided on the first valve chamber. The gas shut-off component is fixedly connected to the first valve chamber. A gas inlet is provided on the first valve chamber and is configured to connect the valve body to a gas source. The second valve chamber is divided into upper and lower proportional chambers. The first valve chamber is connected with the upper proportional chamber. The gas proportional control component is configured to control a size of a connection area between the upper and the lower proportional chambers, and a gas outlet is provided on the second valve chamber and connected with the lower proportional chamber.

4 Claims, 4 Drawing Sheets

(56) References Cited

FOREIGN PATENT DOCUMENTS

WO      WO-2022215100 A1 * 10/2022 .............. F16F 1/047

OTHER PUBLICATIONS

Translation of CN116816974 retrieved from espacenet.com (Year: 2025).*
Translation of CN207035457 retrieved from espacenet.com (Year: 2025).*
Translation of CN215110841 retrieved from espacenet.com (Year: 2025).*
Translation of CN217030066 retrieved from espacenet.com (Year: 2025).*
Machine Translation of CN114992638 retrieved from espacenet.com (Year: 2025).*
Machine Translation of WO2022085157 retrieved from espacenet.com. (Year: 2025).*

* cited by examiner

DIRECT-FIT VERTICAL GAS PROPORTIONAL VALVE

TECHNICAL FIELD

The disclosure relates to the technical field of proportional valves, and more particularly to a direct-fit vertical gas proportional valve.

BACKGROUND

Nowadays, a gas proportional valve is a crucial component in the field of a recreational vehicle (RV) water heater.

In commercially available gas proportional valves, a gas inlet and the gas proportional valve, as well as the gas proportional valve and a burner, need to be connected by metal elbow pipes, which not only makes the installation complicated and costly but also increases the number of gas connection ports, thereby raising the safety risk of gas leakage. Therefore, the disclosure provides a direct-fit vertical gas proportional valve.

SUMMARY

The disclosure aims to provide a direct-fit vertical gas proportional valve, so as to solve the problems of complicated installation and higher gas leakage risk of a gas proportional valve for a RV.

To achieve the above objectives, the disclosure provides the following technical solutions.

A direct-fit vertical gas proportional valve, including a valve body, a gas shut-off component, and a gas proportional control component. The valve body is internally provided with a first valve chamber and a second valve chamber, the first valve chamber is connected with the second valve chamber; a first valve hole is provided on the first valve chamber, the gas shut-off component is fixedly connected to the first valve chamber and is configured to control the first valve hole to be opened or closed; a gas inlet is provided on the first valve chamber and is configured to connect the valve body to a gas source through the gas inlet; the second valve chamber is divided into an upper proportional chamber and a lower proportional chamber which are connected with each other; the first valve chamber is connected with the upper proportional chamber; the gas proportional control component is configured to control a size of a connection area between the upper proportional chamber and the lower proportional chamber; a gas outlet is provided on the second valve chamber, and the gas outlet is connected with the lower proportional chamber.

In an embodiment, the valve body is provided with a flange and threaded connection holes at a position of the gas outlet.

In an embodiment, a first machined hole is disposed on a side of the valve body facing away from the gas shut-off component and the gas proportional control component, and the first machined hole is sealed by a sealing plate.

In an embodiment, a mounting seat is provided on the sealing plate, and an extending direction of the mounting seat is perpendicular to action directions of the gas shut-off component and the gas proportional control component.

In an embodiment, the gas shut-off component and the gas proportional control component are installed on a same surface of the valve body.

In an embodiment, an inlet nozzle is provided on the gas inlet.

In an embodiment, the proportional valve further includes: a gas distributor rod, fixedly connected to the valve body through the gas outlet.

In summary, compared with the related art, the disclosure has at least the following beneficial effects.

The direct-fit vertical gas proportional valve provided by the disclosure integrates the gas shut-off component and the gas proportional control component on the valve body, and the gas shut-off component and the gas proportional control component are connected by a channel inside the valve body. Compared with the related art, the direct-fit vertical gas proportional valve of the disclosure does not need to provide a pipe between the gas inlet and the gas source and a pipe between the gas outlet and the gas distributor rod, thereby not only reducing costs but also minimizing the risk of gas leakage.

Figure 1:
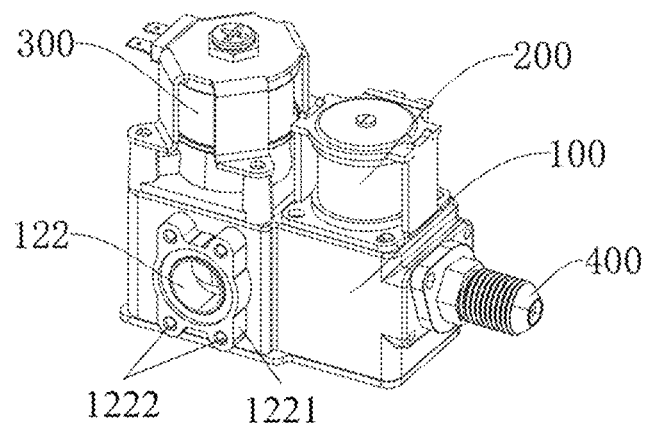
FIG. 1 illustrates a schematic structural diagram of a direct-fit vertical gas proportional valve in a first perspective according to an embodiment 1 of the disclosure.
Figure 2:
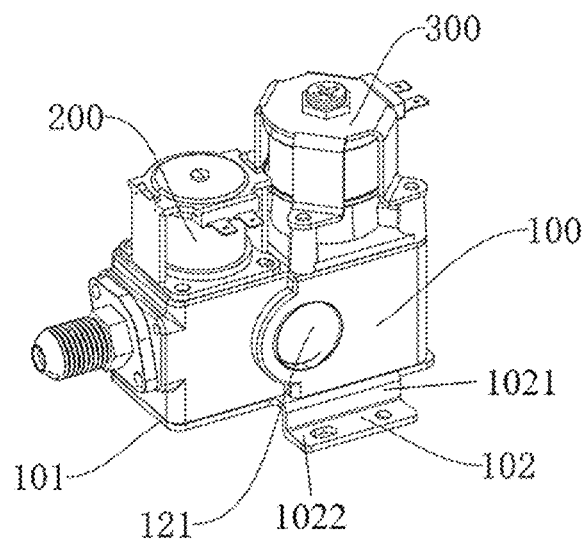
FIG. 2 illustrates a schematic structural diagram of the direct-fit vertical gas proportional valve in a second perspective according to the embodiment 1 of the disclosure.
Figure 3:
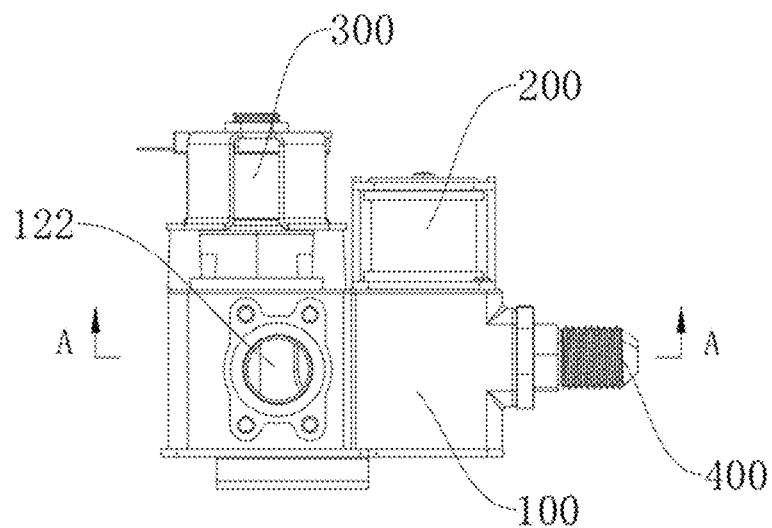
FIG. 3 illustrates a front view of the direct-fit vertical gas proportional valve according to the disclosure.
Figure 4:
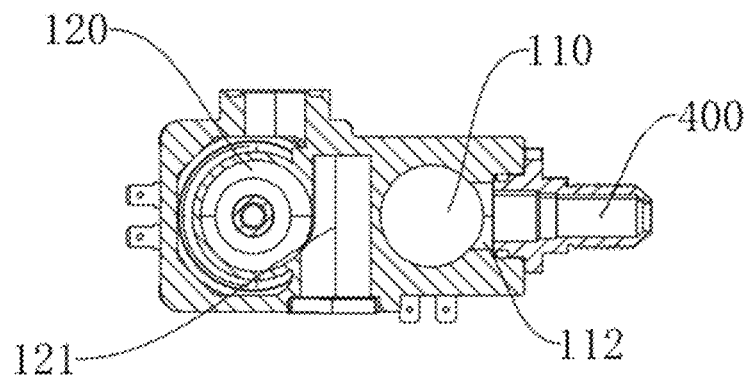
FIG. 4 illustrates a sectional view of the direct-fit vertical gas proportional valve along a line A-A in FIG. 3.
Figure 5:
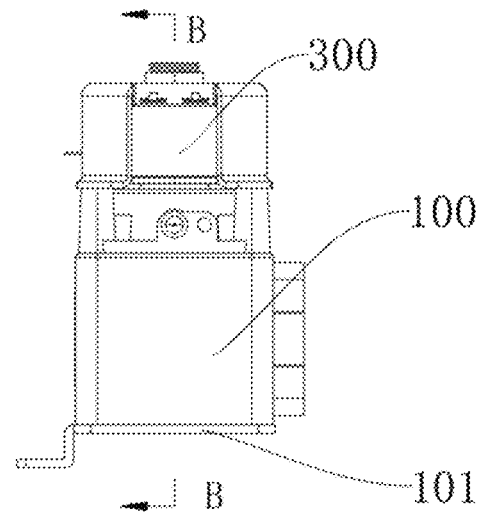
FIG. 5 illustrates a left view of the direct-fit vertical gas proportional valve in FIG. 3.

Description of reference numerals: 100: valve body; 101: sealing plate; 102: mounting seat; 1021: first plate; 1022: second plate; 103: first machined hole; 110: first valve chamber; 111: first valve hole; 112: gas inlet; 113: upper shut-off chamber; 114: lower shut-off chamber; 120: second valve chamber; 121: connecting hole; 122: gas outlet; 1221: flange; 1222: threaded connection hole; 123: upper proportional chamber; 124: lower proportional chamber; 125: second valve hole; 200: gas shut-off component; 201: first actuator; 300: gas proportional control component; 301: second actuator; 400: inlet nozzle; 500: gas distributor rod.

DETAILED DESCRIPTION OF EMBODIMENTS

The technical solutions in embodiments of the disclosure will be clearly and completely described in combination with attached drawings in the embodiments of the disclosure. Apparently, the described embodiments are merely some of the embodiments of the disclosure, not all of them. Based on the described embodiments of the disclosure, all other embodiments obtained by those skilled in the art without making creative labors fall within the scope of protection of the disclosure.

Embodiment 1

As illustrated in FIG. 1 to FIG. 6, a direct-fit vertical gas proportional valve is provided in the embodiment of the disclosure, which includes a valve body 100, a gas shut-off component 200, and a gas proportional control component 300. The valve body 100 is internally provided with a first valve chamber 110 and a second valve chamber 120, and the first valve chamber 110 is connected with the second valve chamber 120. A first valve hole 111 is provided on the first valve chamber 110. The gas shut-off component 200 is fixedly connected to the first valve chamber 110 and is configured to control the first valve hole 111 to be opened or closed. A gas inlet 112 is provided on the first valve chamber 110 and is configured to connect the valve body 100 to a gas source through the gas inlet 112. The first valve chamber 110 is connected to an interior of the gas proportional control component 300. The gas proportional control component 300 is fixed to the second valve chamber 120 and is configured to control a flow rate of gas. A gas outlet 122 is provided on the second valve chamber 120 and is configured to connect the valve body 100 to a gas device through the gas outlet 122.

In the embodiment, the first valve chamber 110 and the second valve chamber 120 are both provided within the valve body 100. The gas shut-off component 200 and the gas proportional control component 300 are fixed on the valve body 100. A channel connecting the gas shut-off component 200 and the gas proportional control component 300 is formed by the valve body 100, so that pipe connection between the gas shut-off component 200 and the gas proportional control component 300 is not required, thereby saving ports and pipes between the gas shut-off component 200 and the gas proportional control component 300 and thus reducing the cost. Further, the first valve chamber 110 and the second valve chamber 120 are connected by an internal channel, thereby reducing the risk of gas leakage. When the direct-fit vertical proportional valve works, gas enters the first valve chamber 110 through the first valve hole 111, and opening and closing of the first valve chamber 110 is controlled by the gas shut-off component 200. When the gas shut-off component 200 is opened, the gas proportional control component 300 controls the flow rate of the gas entering the second valve chamber 120, and thus controls a ratio of the gas to air.

The direct-fit vertical gas proportional valve provided by the disclosure integrates the gas shut-off component 200 and the gas proportional control component 300 onto the valve body 100. The gas shut-off component 200 and the gas proportional control component 300 are connected by the channel inside the valve body 100. Compared with the related art, the direct-fit vertical gas proportional valve of the disclosure does not need to provide pipes among the gas inlet 112 and the gas source and a pipe between the gas outlet 122 and the gas distributor rod 500, thereby not only reducing costs but also minimizing the risk of gas leakage.

In an embodiment, the valve body 100 is processed by casting, and has a cast-iron structure and a square shape. The first valve chamber 110 and the second valve chamber 120 are respectively disposed at different side ends of the valve body 100. The first valve chamber 110 is divided into an upper shut-off chamber 113 and a lower shut-off chamber 114 by a first partition. The gas inlet 112 is connected with the upper shut-off chamber 113. The first valve hole 111 is disposed on the first partition to connect the upper shut-off chamber 113 with the lower shut-off chamber 114. The second valve chamber 120 is divided into an upper proportional chamber 123 and a lower proportional chamber 124 by a second partition. A second valve hole 125 is provided on the second partition to connect the upper proportional chamber 123 with the lower proportional chamber 124. The upper proportional chamber 123 is connected with the lower shut-off chamber 114 by a connecting hole 121.

The gas shut-off component 200 and the gas proportional control component 300 are a gas shut-off component and a gas proportional control component in the prior art, which are not described herein. The gas shut-off component 200 and the gas proportional control component 300 are fixedly connected to the valve body 100 by bolts. The first valve chamber 110 and the second valve chamber 120 are respectively provided with mounting holes at a top of the valve body 100 to mount the gas shut-off component 200 and the gas proportional control component 300 on the valve body 100. Actuators of the gas shut-off component 200 and the gas proportion control component 300 are respectively installed in the first valve chamber 110 and the second valve chamber 120 through the mounting holes. In an embodiment, the gas shut-off component 200 and the gas proportional control component 300 are respectively electromagnetic actuators of a shut-off valve and a proportional valve in the prior art. For example, the gas shut-off component 200 includes a first solenoid valve and a first valve core, and the first solenoid valve is configured to drive the first valve core to move up and down, thereby making the first valve core to block or open the first valve hole 111, thereby opening or closing a gas channel. For example, the gas proportional control component 300 includes a second solenoid valve and a second valve core, and the second solenoid valve is configured to drive the second valve core to move up and down to control a channel between the second valve core and the second valve hole 125 to be blocked or opened, thereby controlling the flow rate of gas.

Figure 6:
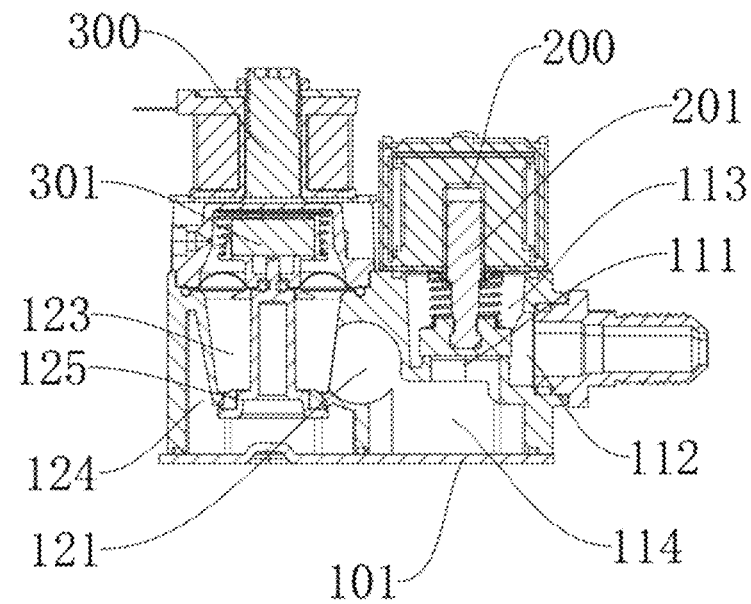
FIG. 6 illustrates a sectional view of the direct-fit vertical gas proportional valve along a line B-B in FIG. 5
Figure 8:
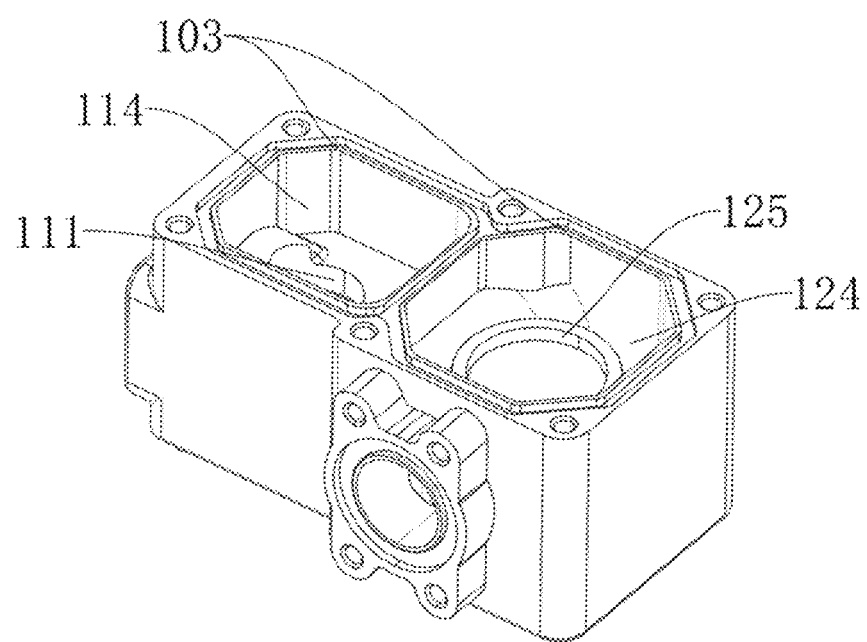
FIG. 8 illustrates a schematic structural diagram of a valve body of the direct-fit vertical gas proportional valve according to the embodiments of the disclosure.

In an embodiment, as illustrated in FIG. 6 and FIG. 8, a first machined hole 103 is disposed on a side of the valve body 100 facing away from the gas shut-off component 200 and the gas proportional control component 300 to facilitate machine tool machining of the first valve chamber 110 and the second valve chamber 120. The first machined hole 103 is sealed by a sealing plate 101, the sealing plate 101 is fixedly connected to the valve body 100 through the first machined hole 103 by screws, and a sealing ring is provided between the sealing plate 101 and the valve body 100 to improve sealing effect of the direct-fit vertical gas proportional valve.

In an embodiment, the sealing plate 101 is provided with a mounting seat 102 thereon, and an extending direction of the mounting seat 102 is perpendicular to action directions of the gas shut-off component 200 and the gas proportional control component 300. As illustrated in FIG. 6, an actuator of the gas shut-off component 200 is a structure of a first actuator 201 illustrated in FIG. 6, and the structure of the first actuator 201 is a valve core of the gas shut-off component in the prior art; an actuator of the gas proportional control component 300 is a second actuator 301 illustrated in FIG. 6, and the second actuator 301 is a valve core of the gas proportional control component in the prior art. The gas shut-off component 200 and the gas proportional control component 300 are installed on a same surface of the valve body 100, as such, when the direct-fit vertical gas proportional valve is installed, inner membranes of the gas shut-off component 200 and the gas proportional control component 300 are oriented parallel to the extending direction of the mounting seat 102 and the action directions of the actuators of the gas shut-off component 200 and the gas proportional control component 300 are perpendicular to the extending direction of the mounting seat 102. When the mounting seat 102 is installed horizontally, directions of the inner membranes of the gas shut-off component 200 and the gas proportional control component 300 are parallel to a horizontal plane, and the action directions of the actuators of the gas shut-off component 200 and the gas proportional control component 300 coincide with a direction of gravity.

In an embodiment, an inlet nozzle 400 is provided on the first valve hole 111 to connect the valve body 100 to the gas source.

Embodiment 2

Figure 7:
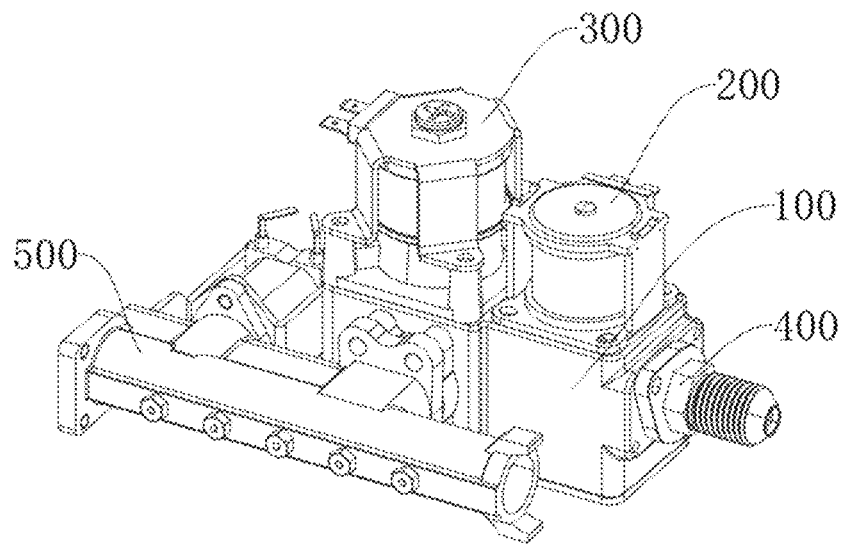
FIG. 7 illustrates a schematic structural diagram of a direct-fit vertical gas proportional valve according to an embodiment 2 of the disclosure.

As another embodiment of the disclosure, as illustrated in FIG. 7, the embodiment 2 is distinguished from the embodiment 1 in that, the direct-fit vertical gas proportional valve in the embodiment 2 further includes: a gas distributor rod 500, which is fixedly connected to the valve body 100 through gas outlet 122.

In the embodiment, the gas distributor rod 500 is a gas distributor rod in the prior art, and a gas nozzle is provided on the gas distributor rod 500 to inject gas from the valve body 100 into a burner.

In an embodiment, a flange 1221 and threaded connection holes 1222 are provided on the valve body 100 at a position of the gas outlet 122, and the gas distributor rod 500 is threadedly connected to the valve body 100.

The terms used in the disclosure are merely to describe specific embodiments but not intended to limit the disclosure. The singular forms "a", "an", and "the" used in the disclosure and the attached claims are also intended to include the plural forms, unless the context clearly indicates otherwise. It should also be understood that the term "and/or" used herein refers to and includes any and all possible combinations of one or more of the associated listed items.

It should be understood that although terms such as first, second, and third may be used in the disclosure to describe various information, such information should not be limited by these terms. These terms are only used to distinguish information of the same type from each other. For example, without departing from the scope of protection of the disclosure, the first information may also be referred to as the second information, and similarly, the second information may also be referred to as the first information. Depending on the context, the word "if" used herein may be interpreted as "when" or "during" or "in response to the determination".

Although the embodiments of the disclosure have been shown and described, it will be understood by those skilled in the art that a variety of changes, modifications, substitutions and variations can be made to these embodiments without departing from the principle and spirit of the disclosure, and the scope of protection of the disclosure is defined by the attached claims and their equivalents.

What is claimed is:

1. A direct-fit vertical gas proportional valve, comprising a valve body, a gas shut-off component, and a gas proportional control component;
    wherein the valve body is internally provided with a first valve chamber and a second valve chamber, the first valve chamber is connected with the second valve chamber, a first valve hole is provided on the first valve chamber, and the gas shut-off component is fixedly connected to the first valve chamber and is configured to control the first valve hole to be opened or closed;
    wherein a gas inlet is provided on the first valve chamber and is configured to connect the valve body to a gas source through the gas inlet, the second valve chamber is divided into an upper proportional chamber and a lower proportional chamber which are connected with each other, the first valve chamber is connected with the upper proportional chamber, the gas proportional control component is configured to control a size of a connecting area between the upper proportional chamber and the lower proportional chamber, a gas outlet is provided on the second valve chamber, and the gas outlet is connected with the lower proportional chamber;
    wherein the valve body is provided with a flange and threaded connection holes at a position of the gas outlet;
    wherein a gas distributor rod is threadedly connected to the flange at the gas outlet; and a gas nozzle is provided on the gas distributor rod to inject gas from the valve body into a burner,
    wherein a first machined hole is disposed on a side of the valve body facing away from the gas shut-off component and the gas proportional control component, and the first machined hole is sealed by a sealing plate;
    wherein a mounting seat is provided on the sealing plate; and
    wherein the mounting seat is L-shaped, and consists of a first plate connected to the sealing plate and a second plate connected to the first plate; an extending direction of the first plate is parallel with the action directions of the gas shut-off component and the gas proportional control component; and an extending direction of the second plate is perpendicular to the action directions of the gas shut-off component and the gas proportional control component.

2. The direct-fit vertical gas proportional valve as claimed in claim 1, wherein the gas shut-off component and the gas proportional control component are installed on a same surface of the valve body.

3. The direct-fit vertical gas proportional valve as claimed in claim 1, wherein an inlet nozzle is provided on the gas inlet.

4. A direct-fit vertical gas proportional valve, comprising a valve body, a gas shut-off component, and a gas proportional control component;
    wherein the valve body is internally provided with a first valve chamber and a second valve chamber, the first valve chamber is connected with the second valve chamber, a first valve hole is provided on the first valve chamber, a second valve hole is provided on the second valve chamber, and the gas shut-off component is fixedly connected to the first valve chamber and is configured to control the first valve hole to be opened or closed;
    wherein a gas inlet is provided on the first valve chamber and is configured to connect the valve body to a gas source through the gas inlet, the second valve chamber is divided into an upper proportional chamber and a lower proportional chamber which are connected with each other, the first valve chamber is connected with the upper proportional chamber, the gas proportional control component is configured to control a size of a connecting area between the upper proportional chamber and the lower proportional chamber, a gas outlet is provided on the second valve chamber, and the gas outlet is connected with the lower proportional chamber; and
    wherein two first machined holes are disposed on a side of the valve body facing away from the gas shut-off component and the gas proportional control component and are separated from each other, the two first machined holes are respectively connected with the first valve hole and the second valve hole in position and correspond to the first valve hole and the second valve hole in position, respectively, and the two first machined holes are provided to facilitate machining of the first valve chamber and the second valve chamber, wherein the two first machined holes are sealed by a sealing plate, and a mounting seat is provided on the sealing plate; and wherein the mounting seat is L-shaped, and consists of a first plate connected to the sealing plate and a second plate connected to the first plate; an extending direction of the first plate is parallel with action directions of the gas shut-off component and the gas proportional control component; and an extending direction of the second plate is perpendicular to the action directions of the gas shut-off component and the gas proportional control component.

* * * * *